United States Patent
Swerdlow

(10) Patent No.: US 12,328,199 B2
(45) Date of Patent: *Jun. 10, 2025

(54) PARTICIPANT AUDIO STREAM MODIFICATION

(71) Applicant: Zoom Communications, Inc., San Jose, CA (US)

(72) Inventor: Nick Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,863

(22) Filed: Jul. 11, 2024

(65) Prior Publication Data

US 2024/0364551 A1 Oct. 31, 2024

Related U.S. Application Data

(63) Continuation of application No. 17/977,705, filed on Oct. 31, 2022.

(51) Int. Cl.
*H04L 12/18* (2006.01)

(52) U.S. Cl.
CPC ...... *H04L 12/1822* (2013.01); *H04L 12/1818* (2013.01); *H04L 12/1831* (2013.01)

(58) Field of Classification Search
CPC ............. H04L 12/1822; H04L 12/1818; H04L 12/1831
See application file for complete search history.

(56) References Cited

U.S. PATENT DOCUMENTS

| | | |
|---|---|---|
| 8,121,845 B2 | 2/2012 | Kirby |
| 8,537,978 B2 | 9/2013 | Jaiswal et al. |
| 9,413,891 B2 | 8/2016 | Dwyer et al. |
| 9,443,518 B1 | 9/2016 | Gauci |
| 10,432,687 B1 | 10/2019 | Hanes et al. |
| 10,764,534 B1 | 9/2020 | Shevchenko et al. |

(Continued)

OTHER PUBLICATIONS

IMyFone, 6 Popular Real-Time Voice Changers for Zoom [2022 List], Karen William, Sep. 10, 2021 (Updated Jul. 5, 2022), 8 pages.

(Continued)

*Primary Examiner* — Raqiul A Choudhury
(74) *Attorney, Agent, or Firm* — Young Basile Hanlon & MacFarlane, P.C.

(57) ABSTRACT

The audio stream of a participant to a conference is modified within the conference to change a perceptible output of a characteristic of speech represented by the audio stream. An audio stream is obtained from a participant device connected to a conference. The audio stream represents speech of a user of the participant device. A user request to modify a first characteristic of the speech is initiated within the conference. The first characteristic is modified without modifying other characteristics of the speech to produce a modified audio stream, such that a second characteristic of the speech remains unmodified within the modified audio stream. An output of the modified audio stream within the conference is then caused in place of the audio stream. The audio stream modification as disclosed herein may be performed while the conference remains ongoing or during playback of a recording of the conference.

20 Claims, 9 Drawing Sheets

(56) References Cited

U.S. PATENT DOCUMENTS

| | | |
|---|---|---|
| 11,450,334 B2 | 9/2022 | Pichaimurthy et al. |
| 11,563,855 B1 | 1/2023 | Spivak et al. |
| 2004/0263636 A1* | 12/2004 | Cutler .................... H04N 7/15 |
| | | 348/211.3 |
| 2007/0230372 A1 | 10/2007 | He et al. |
| 2013/0139259 A1 | 5/2013 | Tegreene |
| 2013/0329866 A1 | 12/2013 | Mai et al. |
| 2014/0028784 A1 | 1/2014 | Deyerle et al. |
| 2015/0012270 A1 | 1/2015 | Reynolds |
| 2015/0149173 A1 | 5/2015 | Korycki |
| 2022/0051652 A1 | 2/2022 | Winsvold et al. |
| 2022/0199102 A1 | 6/2022 | Ostrand et al. |
| 2023/0013497 A1* | 1/2023 | Aher ........................ G06F 3/165 |
| 2023/0117129 A1 | 4/2023 | Mouline et al. |

OTHER PUBLICATIONS

Voicemod, Voice Changer for Video Calls: ZOOM, Hangouts, Facetime, Sep. 2022, 2 pages.

Accent Conversion using Pre-trained Model and Synthesized Data from Voice Conversion, Tuan Nam Nguyen, Ngoc Quan Pham, Alexander Waibel, Karlsruhe Institute of Technology and Carnegie Mellon University, Sep. 2022, 5 pages.

\* cited by examiner

PARTICIPANT AUDIO STREAM MODIFICATION

CROSS-REFERENCE TO RELATED APPLICATION(S)

This application is a continuation of U.S. patent application Ser. No. 17/977,705, filed Oct. 31, 2022, the entire disclosure of which is hereby incorporated by reference.

FIELD

This disclosure generally relates to audio stream modification, and, more specifically, to modifying select characteristics of audio streams representing speech of participants to a conference within the conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
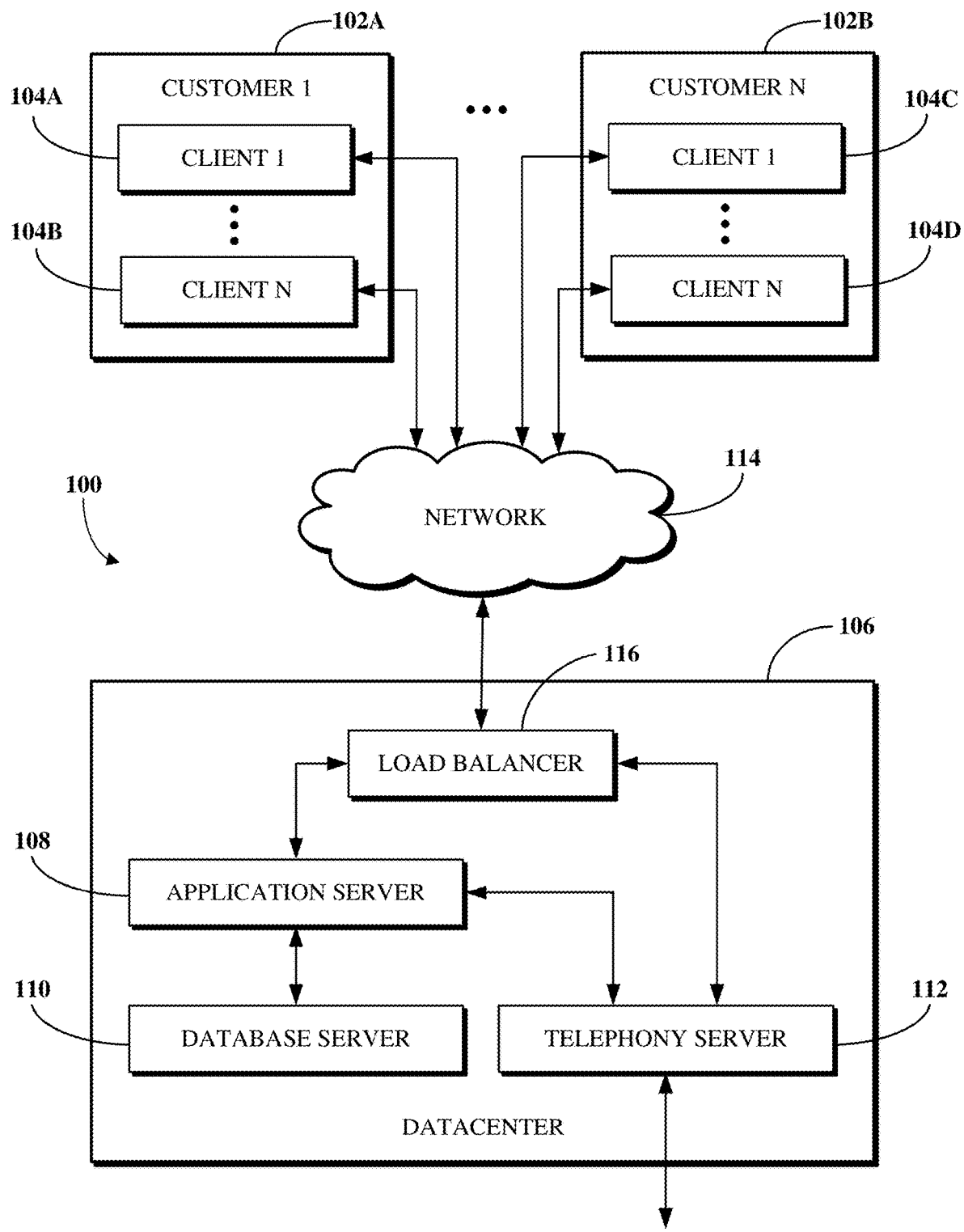
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Participants to an audio or video conference may have different speech qualities based on their physiology, personality, and/or country or region of origin. For example, some participants may, through no fault of the speaker, have trouble parsing speech in certain accents, while others may talk with an unpleasant volume or pitch. These speech issues are represented within audio streams obtained from participant devices connected to a conference, which audio streams are output at the various participant devices for users thereof to hear. In some cases, these speech issues may simply be irritating to other participants of the conference, while in other cases they may be disruptive to the conference. These speech issues extend not only to real-time communications but also to recordings thereof, such that a person later reviewing such a recording, whether or not they were a participant to the underlying conference, will also be subject to the same speech issues. In some cases, a participant may wish to resolve speech issues of other participants. In other cases, a participant may wish to resolve their own speech issues.

Implementations of this disclosure address problems such as these by modulating characteristics of speech from one or more participants to an audio or video conference, in real-time during the conference and/or during a later playback of a recording of the conference. Examples of speech characteristics that may be modified include, but are not limited to, a pitch, a volume, a cadence, an inflection, and an accent of a participant's speech. The modification of an audio stream may be based on a manual user request (e.g., in response to a user interacting with a meeting control based on their dislike of a participant's speech characteristic) or automatic (e.g., by one or more models processing audio streams from participant devices in real-time, such as using a scoring approach based on one or more factors representative of undesirable speech characteristics). Software running at a participant device connected to a subject conference or at a server device implementing the conference may receive instructions to modify an audio stream obtained from the same or another participant device according to a processed speech trait derived from the audio stream. For example, a participant device may transmit a user request to modify an audio stream of another conference participant to a server device that will process the user request accordingly to produce a modified audio stream that will then be transmitted to one or more participant devices connected to the conference. In another example, the audio stream for a conference participant may be modified at their own participant device before the audio stream is transmitted to the server for processing and output within the conference.

The implementations of this disclosure may extend to multi-participant communications other than audio or video conferences. For example, characteristics of speech from one or more participants to a telephone call implemented using a telephony service (e.g., a standalone service or a service of a UCaaS or other software platform) may be modulated in real-time during the telephone call and/or during a later playback of a recording of the telephone call. The modification may, for example, be initiated based on a manual user request (e.g., in response to a participant to the telephone call pressing a key, sending a dual tone multi-frequency (DTMF) signal, or using other virtual options for sending information to a server from a desktop or mobile phone indicating to cause the modification) or automatic (e.g., by one or more models processing audio streams of the telephone call in real-time, such as at a public switched telephone network (PSTN)-level). In some cases, softphone functionality for connecting a participant device to the telephone call (e.g., via a client application running at the participant device) may include one or more controls for enabling the participant to initiate a user request to modify audio from another participant and/or for indicating one or more speech characteristics of such another participant to modify (e.g., based on a modeling of the audio stream from that other participant).

The implementations of this disclosure may be recognized as describing voice masking techniques for participants to an audio or video conference (or another multi-participant communication, such as a telephone call). However, whereas conventional voice masking approaches have a binary effect, such that they are either on or off, and operate against an entirety of some audio content rather than against specific characteristics thereof, the implementations of this disclosure describe the modification of audio streams based on select characteristics of the participant whose speech is represented in an audio stream, rather than based on all characteristics thereof. Accordingly, the implementations of this disclosure address techniques for, in relevant part, modifying a first characteristic of speech represented within an audio stream without modifying a second characteristic of that speech. In this way, some characteristics of the speech as originally captured will remain perceptible within the resulting, modified audio stream.

To describe some implementations in greater detail, reference is first made to examples of hardware and software structures used to implement a conference participant audio stream modification system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the clients 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a PSTN system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
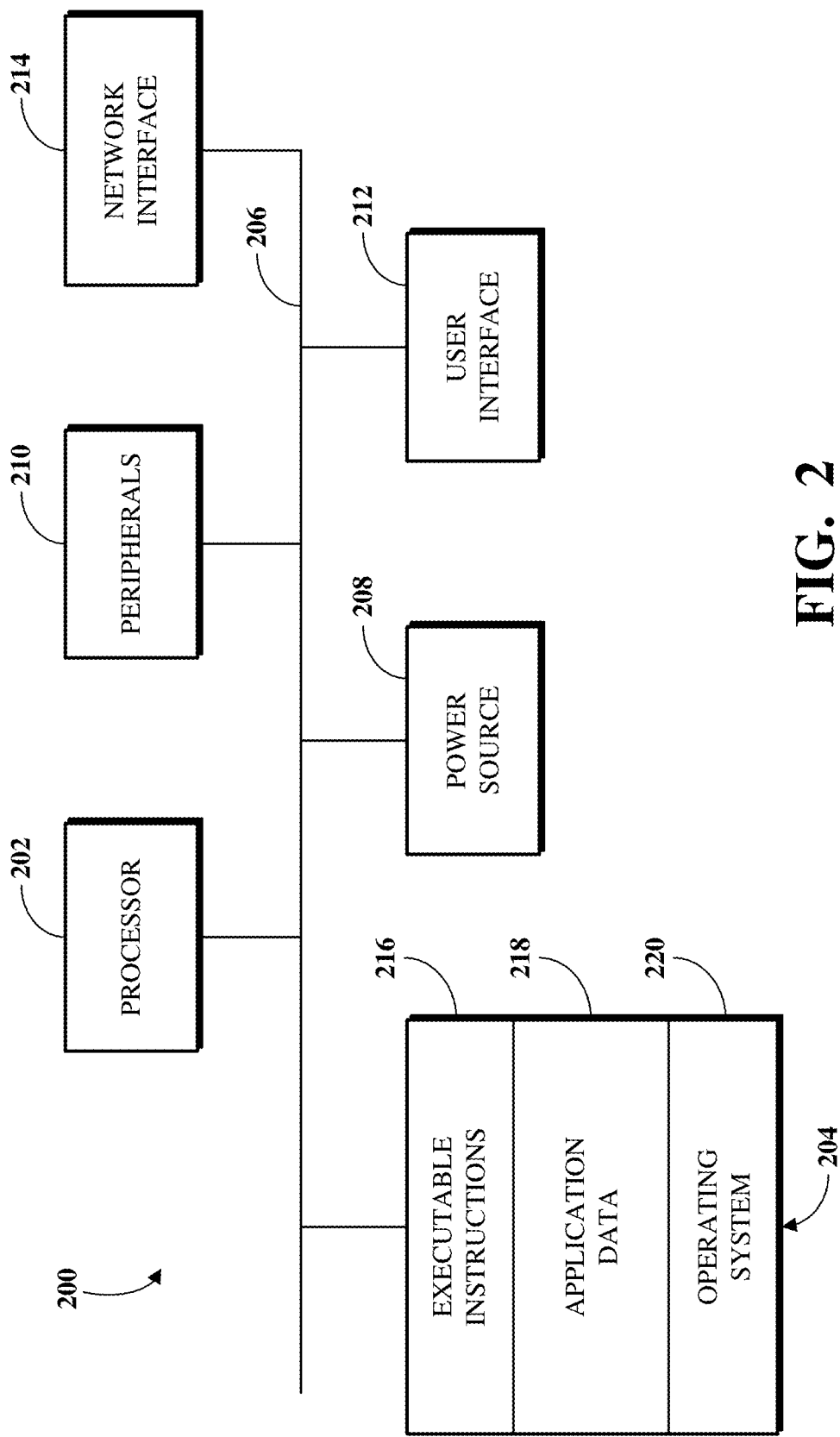
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
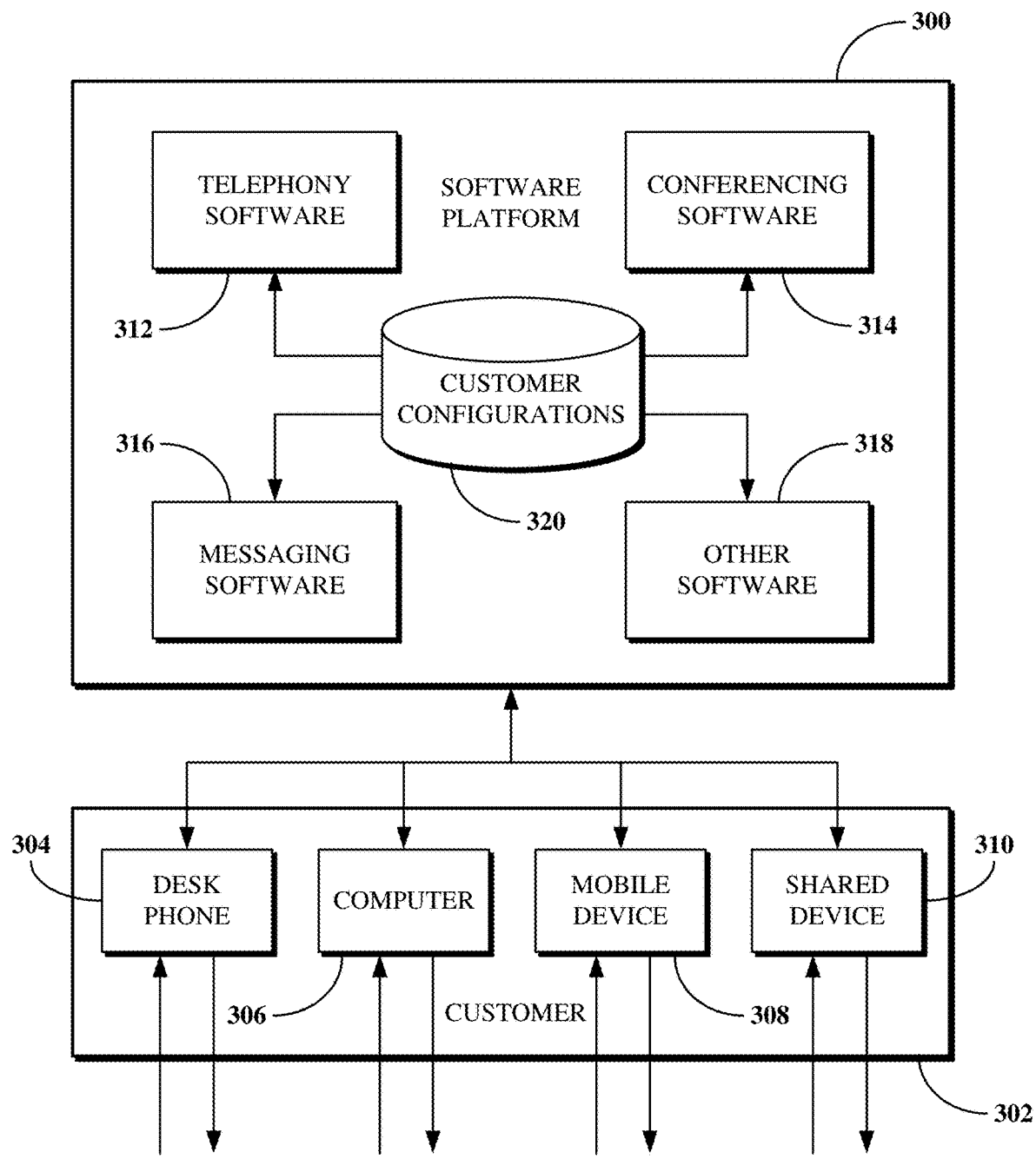
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for modifying select characteristics of audio streams representing speech of participants to a conference within the conference. In some such cases, the other software 318 may be or be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
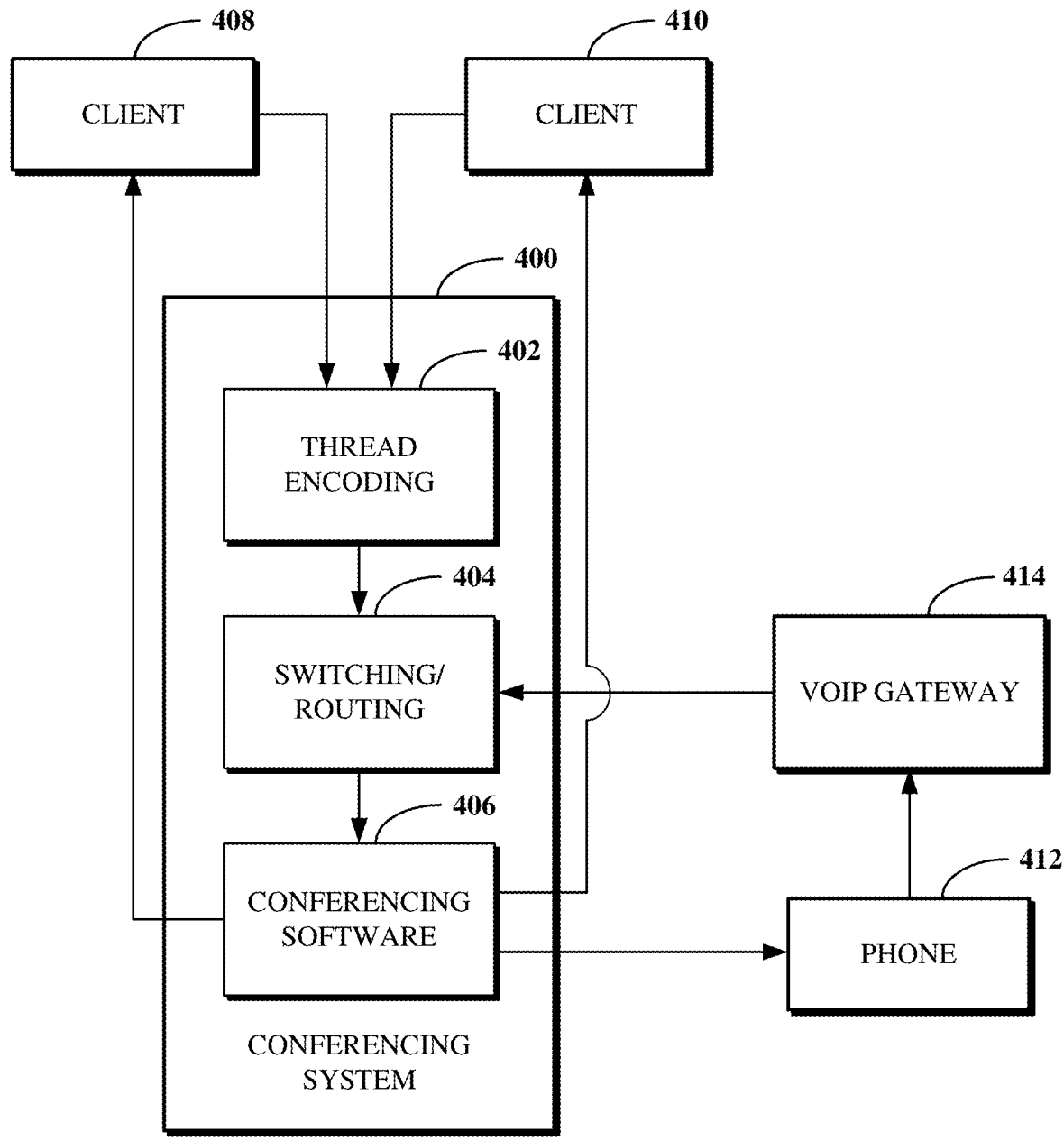
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, be the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients.

A user of the phone 412 participates in a conference using an audio-only connection and may be referred to an audio-only caller. To participate in the conference from the phone 412, an audio stream from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio stream representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turn on their video stream for any portion of the conference. In some cases, however, the conference may have video disabled, such as where each participant connects to the conference using a phone rather than a client, or where a host of the conference selectively configures the conference to exclude video functionality.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between participants. Those other software services may be implemented at the conferencing system 400 and/or a different aspect of the system 100.

Figure 5:
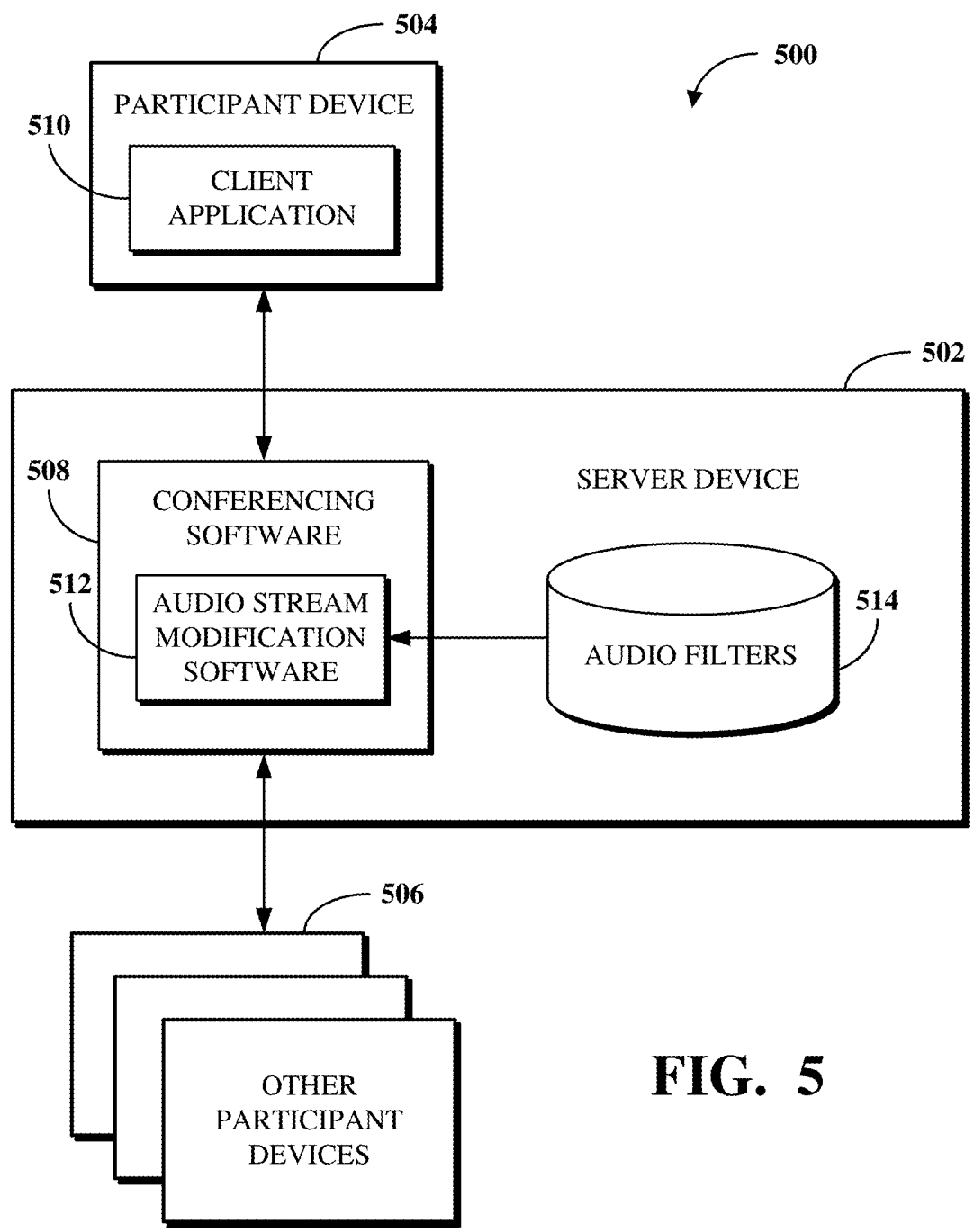
FIG. 5 is a block diagram of an example of a conference participant audio stream modification system.

FIG. 5 is a block diagram of an example of a conference participant audio stream modification system 500. The system 500 includes a server device 502, a participant device 504, and other participant devices 506. Each of the participant device 504 and the other participant devices 506 may, for example, be one of the clients 408 or 410. In some cases, one or more of the other participant devices 506 may be a phone, for example, the phone 412. The participant device 504 and the other participant devices 506 are used to connect to and participate in an audio or video conference implemented by conferencing software 508 at the server device 502. The conferencing software 508 may, for example, be the conferencing software 406.

The participant device 504 connects to the conferencing software 508 using a client application 510, which is a client-side software application running at the participant device 504. The client application 510 may, for example, be a desktop software application, mobile application, or web application associated with one or more services of a software platform, for example, the software platform 300 shown in FIG. 3. The client application 510 may be software that allows a user of the participant device 504 to access or otherwise use one or more of the software 312 through 318 shown in FIG. 3. While not shown, at least some of the other participant devices 506 may also connect to the conference using a client application running at those ones of the other participant devices 506.

The conferencing software 508 includes or otherwise uses audio stream modification software 512 for modifying select characteristics of audio streams representing speech of participants to a conference within the conference. In particular, the audio stream modification software 512 enables a user of the participant device 504 to initiate a user request for modifying one or more characteristics of speech represented within an audio stream from one of the other participant devices 506 or of speech represented within an audio stream from the participant device 504 itself. In some cases, the user request may be initiated based on a prompt, by the audio stream modification software 512, to modify the subject audio stream in some way. In other cases, the user request may be initiated independent of prompts or other processing or output by or of the audio stream modification software 512.

References to an audio stream being modified and/or to a modified audio stream being output by the audio stream modification software 512 "within a conference" are non-limiting as to a time at which such modification and/or output occurs. In particular, the audio stream modification software 512 may modify the audio stream and output the modified audio stream during a conference (i.e., while the conference remains on-going) or during playback of a recording of the conference (i.e., after the conference has ended).

While the audio stream modification software 512 is shown and described as being included within the conferencing software 508, in some implementations, the audio stream modification software 512 or a portion thereof may be external to the conferencing software 508. For example, the audio stream modification software 512 may in some cases represent functionality of a software platform which includes the conferencing software 508 (e.g., the software platform 300) external to but otherwise for use with the conferencing software 508. In another example, the audio stream modification software 512 may be implemented at a participant device, such as within the client application 510.

Figure 6:
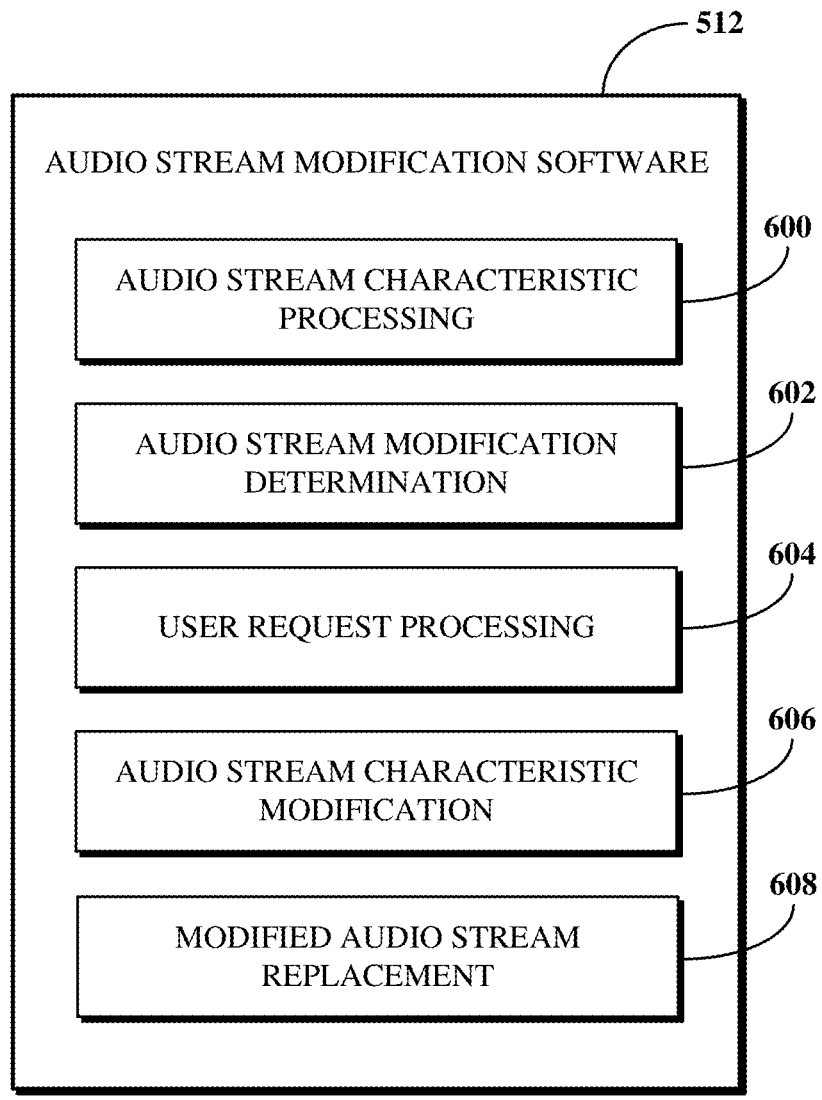
FIG. 6 is a block diagram of an example of functionality of audio stream modification software.

FIG. 6 is a block diagram of an example of functionality of the audio stream modification software 512. The audio stream modification software 512 includes tools, such as programs, subprograms, functions, routines, subroutines, operations, and/or the like, for modifying select characteristics of audio streams representing speech of participants to a conference within the conference. As shown, the audio stream modification software 512 includes an audio stream characteristic processing tool 600, an audio stream modification determination tool 602, a user request processing tool 604, an audio stream characteristic modification tool 606, and a modified audio stream replacement tool 608.

The audio stream characteristic processing tool 600 processes characteristics of speech represented within an audio stream obtained from a participant device within a conference. The characteristics of the speech may, for example, refer or otherwise correspond to one or more of a pitch of the speech, a volume of the speech, a cadence of the speech, an inflection of the speech, or an accent of the speech. The audio stream characteristic processing tool 600 listens to the audio stream obtained from the participant device and, based on a type of the characteristic under processing, either measures values of the characteristic or evaluates the characteristic against a model. The value for a characteristic may be expressed in a unit specific to that characteristic. In one example, the pitch of the speech may be measured in hertz. In another example, the volume of the speech may be measured in decibels. In another example, the cadence of the speech may be measured in a number of spoken words per some period of time (e.g., one second, ten seconds, or one minute). In another example, the inflection of the speech may be measured in a rate of change of pitch of the speech (e.g., a change in hertz over some period, such as thirty seconds or one minute). Measured values may be tracked by the audio stream characteristic processing tool 600 within the conference. For example, the audio stream modification software 512, via the audio stream characteristic processing tool 600 or otherwise, may temporarily store (e.g., in a cache or buffer) data representative of the measured values.

The evaluation of a characteristic against a model may be performed to assign a label to the speech based on the characteristic. In one example, a model may be determined for a specific accent, such as a national or regional (e.g., multi-national, such as referring to a region of a continent including multiple countries or portions thereof, or sub-national, such as referring to multiple regions within a single country) accent. Multiple models may be available for use by the audio stream characteristic processing tool 600, in which each model may correspond to a different national or regional accent. The audio stream characteristic processing tool 600 may evaluate the speech of the audio stream to determine an accent of the speaker.

The audio stream modification determination tool 602 determines to modify a characteristic of the audio stream based on the output of the audio stream characteristic processing tool 600. The audio stream modification determination tool 602 determines to modify a characteristic of the audio stream based on a measured value associated with the characteristic meeting a threshold, being within a threshold range, meeting a threshold range for a threshold period of time, or being within a threshold range for a threshold period of time (each, a "threshold comparison"). The values of a given threshold used for a threshold comparison may be predefined (e.g., based on empirical determination or according to values globally available to users of the conferencing software 508), predefined by a host or participant of a subject conference, or defined within the conference based on the measured values of the characteristics of the speech.

Different threshold comparisons may be used based on the characteristic that the audio stream modification determination tool 602 is evaluating. For example, a determination to modify a pitch of the speech may be based on a measured value for that characteristic meeting (i.e., being above or below) a threshold at any point within the conference. In another example, a determination to modify a volume of the speech may be based on measured values for that characteristic meeting (i.e., being above or below) a threshold for at least a threshold period of time (e.g., thirty seconds) within the conference. In yet another example, a determination to modify an accent of the speech may be based on the modeled accent of the speech being different from a threshold percentage of modeled accents of speech from other participant devices in the conference. Alternatively, the threshold comparison to use for a given characteristic may be set by a user of a participant device connected to the conference or by the audio stream modification determination tool 602 itself. For example, a determination to modify any of a pitch of the speech, a volume of the speech, a cadence of the speech, or an inflection of the speech may be based on whether any of those characteristics meet a threshold range for a threshold period of time.

The user request processing tool 604 obtains or otherwise detects a user request initiated from a participant device within the conference. The user request is a request, from a user of a participant device, to modify a characteristic of speech represented by an audio stream within the conference. The user request may be initiated based on a prompt presented at the participant device within the conference. For example, the prompt may be a visual prompt (e.g., a pop-up within an existing or new window) presented within a graphical user interface of the conference or of an associated client application (e.g., the client application 510). In another example, where the participant device is a desktop or other phone, the prompt may be a visual prompt presented within a display region of the participant device. In yet another example, the prompt may be an audio prompt presented audibly to only the subject participant device. The prompt identifies the user corresponding to the audio stream under processing and/or the characteristic of the speech represented by that audio stream to be modified.

The prompt asks the user of the participant device receiving the prompt to verify whether to modify the subject characteristic. For example, the prompt may include the text "Alice's speech volume is higher than a maximum allowable range. Would you like to decrease it?" In another example, the prompt may include the text "We recommend increasing Bob's pitch to a more perceptible level. Please confirm whether to do so." The user request may be initiated in response to the user of the participant device verifying the prescribed modification. For example, the prompt may include interactive user interface elements (e.g., "yes" and "no" buttons) in which an interaction at the participant device with a select user interface element will indicate to proceed with modifying the characteristic.

In some cases, the user request can specify a manner by which to modify the characteristic of the audio stream. For example, the user request may indicate to lower a volume of the speech by an unspecified amount (e.g., a single volume increment), by a specified amount (e.g., reduce the volume by fifty percent of its current value), or to a specified amount (e.g., to thirty percent of the maximum possible volume). In other cases, the characteristic of the audio stream to modify may be determined based on the user request without the user request specifying the manner by which to modify the characteristic. For example, the user request can indicate the characteristic to modify, and the modification may be inferred based on the determination processing by the audio stream modification determination tool 602. In an example in which the characteristic to modify is the volume of the speech, the modification may be inferred to be a decrease to the volume where the measured value of the volume is above a threshold or threshold range, or an increase to the volume where the measured value of the volume is below a threshold or threshold range.

In some implementations, the user request processing tool 604 processes a user request initiated from a participant device other than based on the output of the audio stream modification determination tool 602. For example, the user request from a participant device and processed by the user request processing tool 604 may be initiated based on user input indicating to modify a characteristic of an audio stream rather than based on an interaction with a prompt presented at the participant device based on a processing of the characteristic by the audio stream modification software 512. The user input may, for example, be obtained via an interaction at the participant device with a meeting control of the conference, such as an interactive button presented within a graphical user interface of the conference. In some such implementations, the audio stream characteristic processing tool 600 and the audio stream modification determination tool 602 may be omitted. In other such implementations, the audio stream characteristic processing tool 600 and the audio stream modification determination tool 602, may not be used in the processing of an audio stream.

The audio stream characteristic modification tool 606 modifies the characteristic which is the subject of the user request initiated from the participant device to produce a modified audio stream. Modifying the characteristic can include applying a filter associated with the characteristic against the audio stream. The filter may be or otherwise include a mask used to modulate the characteristic, and thus selected for use, according to a desired modified form of the characteristic, the speaker, and/or other criteria. For example, a filter may be selected based on whether the speaker is male, female, or non-binary (e.g., determined based on a user profile or other software account information input by the speaker). In another example, the filter may be selected based on a measured frequency range for the voice of the speaker. In yet another example, the filter may be specific to a certain accent or pair of accents, such as to cause speech in a first accent to instead sound as if it were spoken in a second accent.

The filter may be accessed from an audio filter data store 514 at the server device 502. For example, the server device 502 may maintain the audio filter data store 514 for use by the audio stream modification software 512 within one or more conferences. In some implementations, the audio filter data store 514 may be maintained at a device other than the server device 502, for example, a different server device or one of the participant devices 504 or 506. For example, where the audio stream modification software 512 is locally run at a participant device instead of at the server device 502, the audio filter data store 514 may be a filter library maintained at that participant device.

The modification of the characteristic by the audio stream characteristic modification tool 606 is specific to that characteristic. As such, the modification of the characteristic by the audio stream characteristic modification tool 606 does not also cause or otherwise result in a modification of other characteristics of the speech. For example, the audio stream characteristic modification tool 606 may modify, based on a user request initiated within the conference, a first characteristic of the speech to produce a modified audio stream, in which a second characteristic of the speech remains unmodified within the modified audio stream.

The modified audio stream replacement tool 608 causes an output, within the conference, of the modified audio stream produced by the audio stream characteristic modification tool 606 in place of the audio stream originally obtained from the subject participant device. Generally, the modified audio stream is output only at the participant device from which the user request is initiated (e.g., the participant device 504). In some implementations, the modified audio stream may be output at multiple participant devices. For example, the modified audio stream may be output at all participant devices. In another example, the modified audio stream may be output at a group of participant devices in which user accounts with the conferencing software 508 share a common domain (e.g., such that the users are inferred to be associated with a common entity).

In that the audio stream will continue after the selection of the filter, the application of the filter to modify the characteristic and thus to produce the modified audio stream includes continuously applying the filter to the audio stream obtained from the subject participant device to produce the modified audio stream. For example, where the audio stream is being modified during the conference, the audio stream characteristic modification tool 606 and the modified audio stream replacement tool 608 may operate throughout the remainder of the conference as an intermediary to the participant device from which the audio stream is obtained and the one or more participant devices to which the modified audio stream will be output. In another example, where the audio stream is being modified during playback of a recording of the conference, the audio stream characteristic modification tool 606 and the modified audio stream replacement tool 608 may operate throughout the remainder of the conference recording.

Generally, the participant whose audio stream is being modified by the audio stream modification software 512 may remain unaware that the modification of their audio stream has occurred or is occurring. However, in some cases, the participant whose audio stream is being modified by the audio stream modification software 512 may receive an alert indicating that their audio is being modified for one or more other participants to the conference. For example, during a video conference, the participant may receive a pop-up notification within a graphical user interface of the video conference indicating that one or more other participants are modifying their audio. In some such cases, the notification may specify the one or more manners by which the audio is being modified (e.g., a decrease in volume or pitch).

In some implementations, the application of the filter during playback of a recording of the conference may operate against a specific file associated with the recording. For example, the audio streams from the various participant devices which were connected to the conference may be saved into individual audio files that are then opened and used for the playback of the recording. In such a case, the audio stream characteristic modification tool 606 may apply the subject filter against an audio file corresponding to the subject audio stream to modify the audio file itself. In some such cases, playback of the recording may be paused while the audio file is accordingly modified. In some cases, the filter may be removed from the audio file following an end of the recording playback. Alternatively, the filter may be applied against a copy of the subject audio file, in which case the original audio file may remain in an unmodified state. This may allow other users of the system 500 to later playback the recording including the subject audio file without the modification caused during the playback described herein.

In some implementations, to prevent loopback in which an echo of the modified audio stream of a participant is captured by a microphone of a different participant and resultingly output to the conference, the audio stream modification software 512 or the conferencing software 508 may cause a microphone of the participant device at which the modified audio stream is output to be muted in response to a determination that the participant whose audio stream is being modified is speaking at a given time. For example, the microphone may be unmuted in response to a determination that the participant has stopped speaking and re-muted and re-unmuted as necessary throughout the conference. In some such cases, a notification that the microphone has been muted and/or unmuted may not be indicated to conference participants other than the participant whose participant device includes the subject microphone.

In some implementations, filters of the audio filter data store 514 or indications of such filters may be shared between conference participants, whether during, before, or after a conference. For example, a conference participant may indicate to another conference participant that they have caused a given filter to be applied for a specific purpose (e.g., decreasing a pitch of a certain other conference participant). The conference participant receiving that indication may then have the option to apply the filter at their participant device to cause the same audio stream to be modified at their participant device, as well.

Although the tools 600 through 608 are shown as separate tools, in some implementations, two or more of the tools 600 through 608 may be combined into a single tool. Although the tools 600 through 608 are shown as functionality of the audio stream modification software 512 as a single piece of software, in some implementations, some or all of the tools 600 through 608 may exist outside of the audio stream modification software 512. Similarly, in some implementations, a software service using the audio stream modification software 512 (e.g., the conferencing software 508) may exclude the audio stream modification software 512 while still including the some or all of tools 600 through 608 in some form elsewhere or otherwise make use of the tools 600 through 608 while some or all of the tools 600 through 608 are included in some form elsewhere.

In some cases, a characteristic modified by the audio stream modification software 512 may correspond other than to a pitch, a volume, a cadence, an inflection, and an accent of a participant's speech. For example, other characteristics relevant to the diction of a participant may be modified according to the implementations of this disclosure. The other characteristics may, for example, relate to the pronunciation of words or certain letters (i.e., certain consonants or vowels). A measured value for pronunciation can track a number of letters that are missed (e.g., not being said or said much more quietly than the rest of the subject word) in one or more words spoken by a given conference participant. Where that measured value indicates that a certain letter is being missed more than a threshold amount or more than a threshold amount within a threshold period of time, a user request may be initiated (e.g., based on a prompt to the participant device) to cause a modification of the audio stream to emphasize that letter within the speech of the audio stream.

While the above discussion relates to conferences, in some implementations, audio modification as performed by the system 500 may be performed against an audio stream of another type of multi-participant communication, such as a telephone call, instead of an audio stream of a conference. For example, the system 500 may omit the conferencing software 508 and instead include telephony software (not shown), such as the telephony software 312. In such a case, the server device 502 may be a telephony server, for example, the telephony server 112 shown in FIG. 1. The telephony software can process the call to access and modify an audio stream from a participant to the telephone call (e.g., within a PSTN) in the same manner as is described above with respect to FIGS. 5 and 6.

Example use cases are now described to illustrate the functionality of the system 500. In a first example use case, the user of the participant device 504, Charles, is in an ongoing conference with the users of the other participant devices 506. A user of one of the other participant devices 506, Danielle, is speaking with a pitch that is too high for Charles. For example, Charles may find Danielle's speech to be difficult to understand or simply unpleasant based on how high the pitch of her speech is. Charles initiates a user request from his participant device to lower the pitch of Danielle's speech by interacting with a meeting control and indicating, based on that interaction, that the pitch of the speech represented by the audio stream from Danielle's participant device should be lowered. A filter is selected and then applied to cause the pitch of further speech from Danielle to sound lower without modifying other characteristics of her speech. The modified audio stream including the lower pitch may be output only to Charles for the remainder of the conference.

In a second example use case, the user of the participant device 504, Eleanor, is in an ongoing conference with the users of the other participant devices 506. A user of one of the other participant devices 506, Francois, is speaking with an accent that is different from the accents in which all other participant device users are speaking. For example, Francois may be speaking in a French accent while all other participant device users are speaking in a midwestern United States accent. Francois' accent is modeled to determine it is a French accent, the other accents are modeled to determine they are midwestern United States accents, and a determination is accordingly made that Francois' accent is different from the others' accents. Eleanor receives a pop-up prompt within the conference asking her to confirm whether she would like Francois' speech to be modified to have a midwestern United States accent. Eleanor indicates to do so by interacting with a "yes" button in the pop-up prompt, and further audio received from Francois' participant device and output at Eleanor's participant device is accordingly modified to sound as if the speech thereof is spoken in a midwestern United States accent.

In a third example use case, the user of the participant device 504, Garrett, is in an ongoing telephone call with users of the other participant devices 506. In particular, Garrett is a salesperson connecting to the telephone call from a softphone on his computer and attempting to close a sale with important customers as the users of the other participant devices 506. During the telephone call, the audio stream from Garrett's computer is processed to determine that Garrett is using a large variance in inflection in his speech, which may be off putting to some of his important customers. The inflection in his speech is determined to exceed a threshold range for a threshold period of time, and Garrett accordingly receives a prompt on his computer recommending that Garrett's audio stream be filtered to reduce the incidence of inflection. Rather than rely upon himself to stop using varied inflection, Garrett initiates a user request to modify his inflection, and a filter is accordingly applied to limit a range of pitches that will be output to the other participant devices 506.

In a fourth example use case, the user of the participant device 504, Hugh, is playing a recording of a conference at the participant device 504. The devices which connected to the conference while it was ongoing include the participant device 504 and the other participant devices 506. While the recording is playing at the participant device 504, Hugh decides that the cadence of speech from the user of one of the other participant devices 506, Irene, is too slow. Hugh initiates a user request to increase the cadence of the speech from Irene's participant device. To do so, a filter is applied to Irene's audio stream to remove one or more periods of silence between portions of the speech. The modified audio stream resulting from the application of the filter is then output for the remaining portion of the recording playback.

Figure 7:
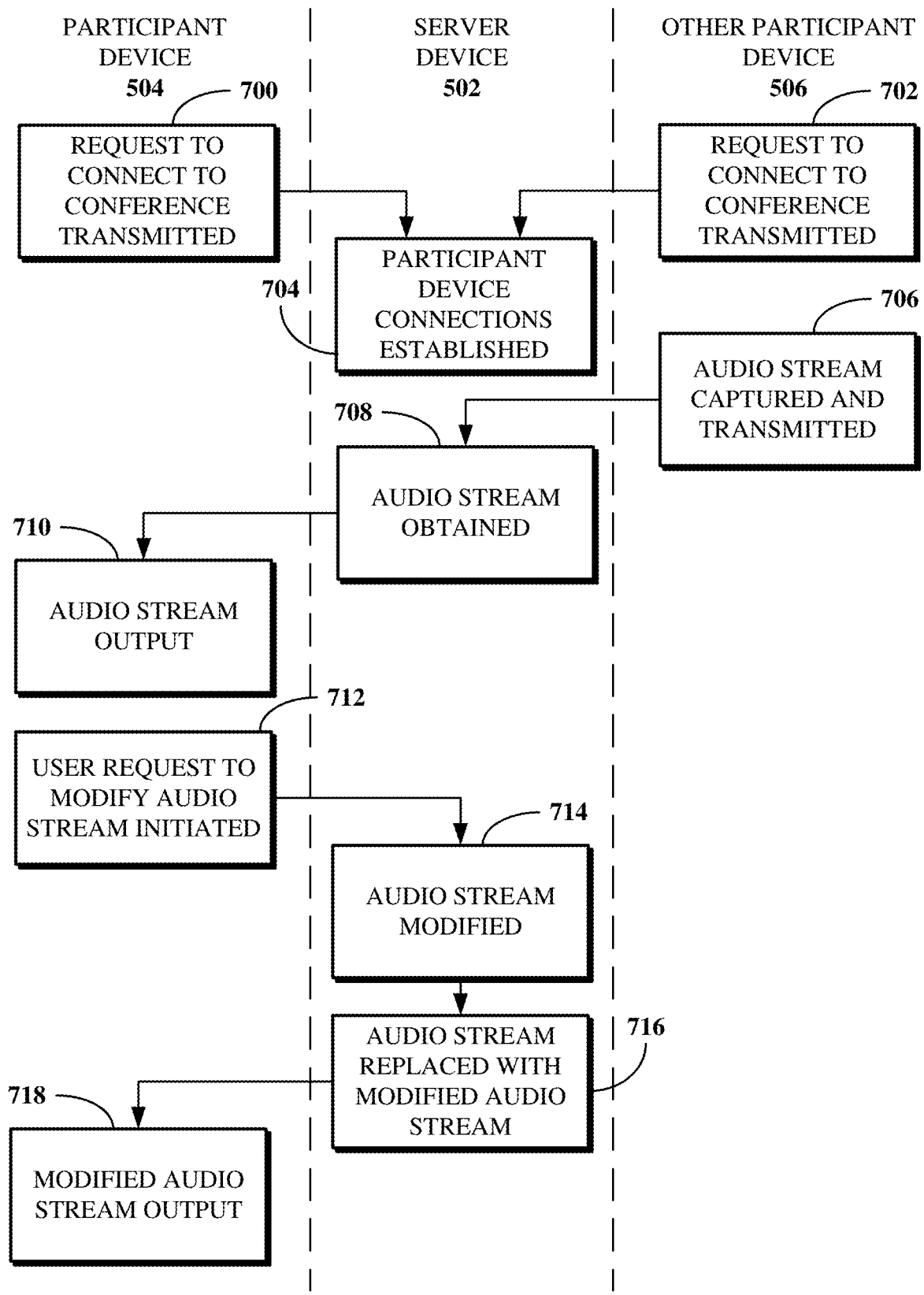
FIG. 7 is an illustration of an example of swim lanes showing an example sequence of operations performed for modifying an audio stream obtained from one participant device based on a user request initiated from a different participant device.

FIG. 7 is an illustration of an example of swim lanes showing an example sequence of operations performed for modifying an audio stream obtained from one participant device based on a user request initiated from a different participant device. At 700 and 702, respectively, requests to connect to a conference implemented by the server device 502 are transmitted from the participant device 504 and one of the other participant devices 506. The requests may be transmitted to the server device 502 simultaneously or one after the other. At 704, the connections of the participant devices 504 and 506 to the conference are established at the server device 502. At 706, at some point during the conference, an audio stream representing speech of a user of the other participant device 506 is captured at the other participant device 506 and transmitted from the other participant device 506 to the server device 502.

At 708, the server device 502 obtains the audio stream from the other participant device 506. At 710, the audio stream is output at the participant device 504 to cause a user of the participant device 504 to hear the speech represented by the audio stream. At 712, at some point after the audio stream from the other participant device 506 is output at the participant device 504, a user request to modify that audio stream is initiated from the participant device 504. At 714, the audio stream is modified at the server device 502 based on the user request initiated from the participant device 504. At 716, a modified audio stream produced by the modification at 714 replaces the audio stream obtained at 708 for transmission to the participant device 504 (and, in some cases, one or more other participant devices connected to the conference, as well). At 718, the modified audio stream is output at the participant device 504.

In some implementations, the audio stream may be modified at 714 at the participant device 504 instead of at the server device 502. For example, a client application running at the participant device 504 may modify the audio stream to prepare the modified audio stream for output at the participant device 504. In at least some such cases, the modified audio stream may be produced and output without modification data or user request data being transmitted from the participant device 504 to the server device 502.

In some implementations, the user request may be initiated based on processing against the audio stream performed at the server device 502. For example, the sequence of operations shown and described with respect to FIG. 7 may include characteristics of the audio stream being processed at the server device 502 and a determination being made at the server device 502 to modify the audio stream based on those processed audio stream characteristics. The processing of the audio stream characteristics may, for example, be to determine that a given characteristic of the audio stream meets a threshold value or has been outside of a threshold range for a threshold period of time. The user request may thereafter be initiated, for example, in response to a prompt presented at the participant device 504 based on a determination to modify the audio stream based on the processing of the audio stream characteristic.

In some implementations, the sequence of operations shown and described with respect to FIG. 7 may apply to a recording of the conference and thus be performed during playback of that recording after the conference has ended rather than during the conference itself. In such a case, the operations described with respect to 700, 702, 704, and 706 may be omitted. At 708, instead of the audio stream being obtained at the server device 502 from the other participant device 506, a request to download or stream the recording may be received at the server device 502 from the participant device 504. At 710, the audio stream is output during the playback of the recording at the participant device 504, whether by local playback where the recording was downloaded to the participant device 504 or by streaming where the recording is streamed to the participant device 504. The remaining operations at 712, 714, 716, and 718 as used with a recording of a conference may be similar to what is described above.

Figure 8:
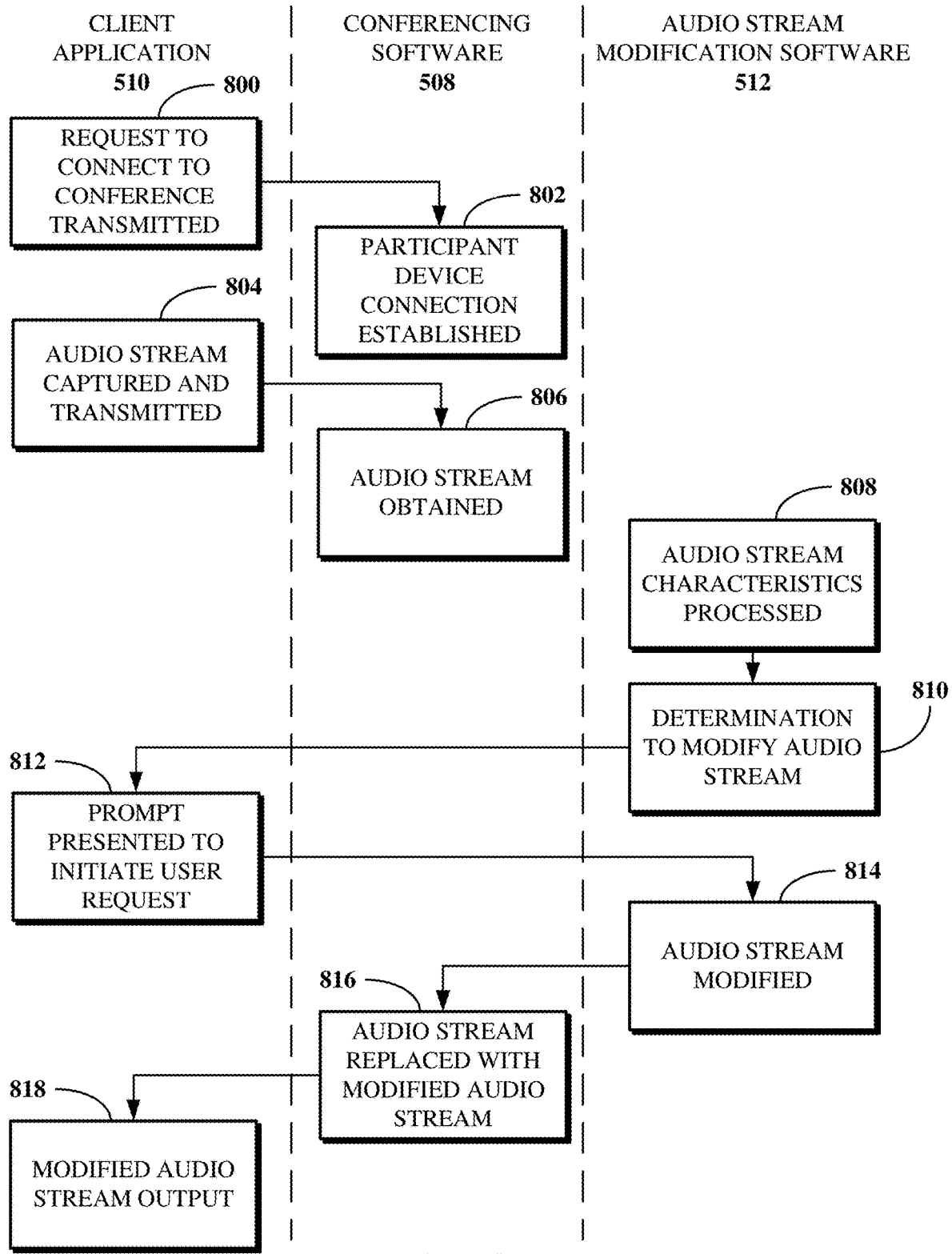
FIG. 8 is an illustration of an example of swim lanes showing an example sequence of operations performed for modifying an audio stream obtained from a participant device based on a user request initiated from the same participant device.

FIG. 8 is an illustration of an example of swim lanes showing an example sequence of operations performed for modifying an audio stream obtained from a participant device based on a user request initiated from the same participant device. At 802, a request to connect to a conference implemented using the conferencing software 508 at the server device 502 is transmitted from the client application 510 running at the participant device 504. At 802, a connection between the participant device 504 and the server device 502, and more specifically between the client application 510 and the conferencing software 508, is established by the conferencing software 508. At 804, at some point during the conference, an audio stream representing speech of a user of the participant device 504 is captured at the participant device 504 and transmitted using the client application 510 to the conferencing software 508. At 806, the conferencing software obtains the audio stream from the client application 510.

At 808, characteristics of the audio stream (e.g., the pitch, volume, inflection, or accent of the speech represented by the audio stream) are processed against one or more thresholds at the audio stream modification software 512 to determine whether one or more such characteristics meet or otherwise breach such thresholds. At 810, a determination is made to modify the audio stream, specifically by modifying a first characteristic of the audio stream based on the processing at 808, is performed at the audio stream modification software 512. At 812, the client application 510 receives an indication of the determination made at 810 and uses same to prompt a user of the participant device 504 to initiate a user request to modify the audio stream. At 814, the audio stream modification software 512 receives the user request initiated from the client application 510 or otherwise an indication thereof and accordingly modifies the audio stream. At 816, the conferencing software replaces the audio stream as originally obtained at 806 with a modified audio stream produced based on the user request. At 818, the modified audio stream is output by the client application 510 for the user of the participant device 504.

In some implementations, the audio stream may be modified at 814 by the client application 510 instead of by the audio stream modification software 512. For example, the client application 510 may modify the audio stream to prepare the modified audio stream for output at the participant device 504. In some such implementations, the operations at 808 and 810 may be performed by the client application 510. For example, the client application 510 in such a case may include the audio stream modification software 512 or functionality thereof. Where the modification of the audio stream occurs at the client application 510, the operations at 816 may be omitted.

In some implementations, the operations at 808, 810, and 812 may be omitted. For example, instead, the sequence of operations shown and described with respect to FIG. 8 may include a user request to modify the audio stream being initiated from the client application 510 and transmitted to the audio stream modification software 512 (e.g., via the conferencing software 508 as an intermediary). In particular, in such a case, the user request may be based other than on an audio stream characteristic processing by the audio stream modification software 512. The audio stream modification software 512 in such a case receives the user request and processes same to modify the audio stream at 814.

In some implementations, the sequence of operations shown and described with respect to FIG. 8 may apply to a recording of the conference and thus be performed during playback of that recording after the conference has ended rather than during the conference itself. In such a case, the operations described with respect to 800, 802, and 804 may be omitted. At 806, instead of the audio stream being obtained by the conferencing software 508 from the client application 510, a request to download or stream the recording may be received at the conferencing software 508 from the client application 510. The audio stream is then output during the playback of the recording at the participant device 504 via the client application 510, whether by local playback where the recording was downloaded to the participant device 504 or by streaming where the recording is streamed to the participant device 504. The remaining operations at 808, 810, 812, 814, 816, and 818 as used with a recording of a conference may be similar to what is described above.

Figure 9:
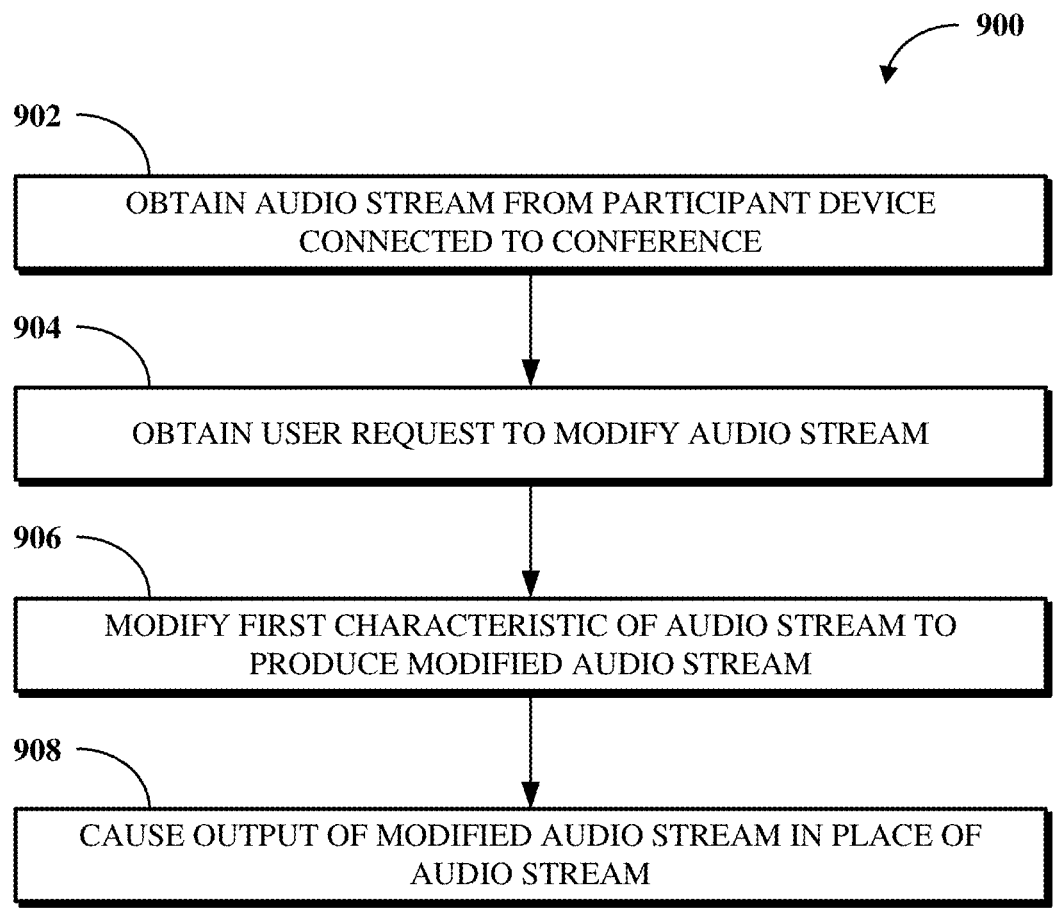
FIG. 9 is a flowchart of an example of a technique for modifying an audio stream of a conference participant.

To further describe some implementations in greater detail, reference is next made to examples of techniques which may be performed by or using a conference participant audio stream modification system. FIG. 9 is a flowchart of an example of a technique 900 modifying an audio stream of a conference participant. The technique 900 can be executed using computing devices, such as the systems, hardware, and software described with respect to FIGS. 1-8. In one example, the technique 900 may be performed at a server device, such as the server device 502. In another example, the technique 900 may be performed at a client device, such as the participant device 504. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations of the technique 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, an audio stream is obtained from a participant device connected to a conference. The audio stream represents speech of a user of the participant device. The conference may, for example, be an audio conference or a video conference.

At 904, a user request to modify the audio stream is obtained. The user request may be obtained based on manual user input, such as in response to a perception of a first characteristic of the audio stream. Alternatively, the user request may be obtained based on a prompt presented in response to a determination that the first characteristic satisfies a threshold comparison (e.g., by a measured value of the first characteristic meeting a threshold or being outside of a threshold range). The first characteristic may, for example, correspond to one of a pitch of the speech, a volume of the speech, a cadence of the speech, an inflection of the speech, or an accent of the speech. For example, the user request may be initiated and obtained from a participant device based on a determination that the pitch of the speech is outside of a threshold range for a threshold period of time. In another example, the user request may be initiated and obtained from a participant device based on a determination that the accent of the speech is different from an accent of speech of other users of participant devices connected to the conference. In some cases, the user request is initiated and obtained from the first participant device. In other cases, the user request is initiated and obtained from a second participant device connected to the conference.

At 906, the first characteristic of the audio stream is modified to produce a modified audio stream. The modification of the first characteristic is independent of other characteristics of the speech. As such, a second characteristic of the speech remains unmodified within the modified audio stream.

At 908, the output of the modified audio stream is caused in place of the audio stream (i.e., as originally obtained from the participant device above). The modified audio stream may be output at a limited number of participant devices connected to the conference. In one example, the modified audio stream may be output only at the participant device from which the user request is obtained, and the audio stream is output without the modification to all other participant devices connected to the conference. In another example, the output of the modified audio stream is to a first subset of participant devices connected to the conference, and the audio stream is output without the modification to a second subset of the participant devices connected to the conference.

In some implementations, the technique 900 can include presenting, to the user of the participant device from which the user request is obtained, a recommendation to apply a filter during one or more future conferences based on the modification of the first characteristic. For example, the recommendation, when accepted, may cause configuration data indicative of the filter to be locally stored at the participant device. A client application connecting the participant device to a future conference may invoke the configuration data to cause the same filter to be applied during that future conference. In some implementations, where the configuration data is generated based on a filter applied against the audio stream from a specific person, the client application may automatically invoke the configuration data to cause the subject filter to be applied during a future conference based on a determination that the specific person about whom the configuration data is generated is a participant to that future conference. In some implementations, configuration data may be shared between participant devices, such as during, before, or after a given conference.

The implementations of this disclosure correspond to methods, non-transitory computer readable media, apparatuses, systems, devices, and the like. In some implementations, a method comprises obtaining an audio stream from a participant device connected to a conference, the audio stream representing speech of a user of the participant device; modifying, based on a user request initiated within the conference, a first characteristic of the speech to produce a modified audio stream, wherein a second characteristic of the speech remains unmodified within the modified audio stream; and causing an output, within the conference, of the modified audio stream in place of the audio stream. In some implementations, a non-transitory computer readable medium stores instructions operable to cause one or more processors to perform operations comprising obtaining an audio stream from a participant device connected to a conference, the audio stream representing speech of a user of the participant device; modifying, based on a user request initiated within the conference, a first characteristic of the speech to produce a modified audio stream, wherein a second characteristic of the speech remains unmodified within the modified audio stream; and causing an output, within the conference, of the modified audio stream in place of the audio stream. In some implementations, an apparatus comprises a memory and a processor configured to execute instructions stored in the memory to obtain an audio stream from a participant device connected to a conference, the audio stream representing speech of a user of the participant device; modify, based on a user request initiated within the conference, a first characteristic of the speech to produce a modified audio stream, wherein a second characteristic of the speech remains unmodified within the modified audio stream; and cause an output, within the conference, of the modified audio stream in place of the audio stream.

In some implementations of the method, non-transitory computer readable medium, or apparatus, the first characteristic corresponds to one of a pitch of the speech, a volume of the speech, a cadence of the speech, an inflection of the speech, or an accent of the speech.

In some implementations of the method, non-transitory computer readable medium, or apparatus, the method comprises, the operations comprise, and the processor is configured to execute the instructions for determining, based on a voice model processing the audio stream, that a perception score for the speech meets a threshold; and presenting an indication that the perception score meets the threshold, wherein the user request is initiated based on the presentation of the indication.

In some implementations of the method, non-transitory computer readable medium, or apparatus, the user request is obtained from the participant device.

In some implementations of the method, non-transitory computer readable medium, or apparatus, the user request is obtained from a second participant device connected to the conference and used by a second user.

In some implementations of the method, non-transitory computer readable medium, or apparatus, the modified audio stream is produced and output while the conference remains in-progress.

In some implementations of the method, non-transitory computer readable medium, or apparatus, the modified audio stream is produced and output during playback of a recording of the conference.

In some implementations of the method, non-transitory computer readable medium, or apparatus, the user request is initiated during playback of a recording of the conference, the first characteristic corresponds to a cadence of the speech, and modifying the first characteristic to produce the modified audio stream comprises removing one or more periods of silence between portions of the speech.

In some implementations of the method, non-transitory computer readable medium, or apparatus, audio streams obtained from participant devices connected to the conference are stored in separate files associated with a recording of the conference, and modifying the first characteristic to produce the modified audio stream comprises altering one of the files corresponding to the audio stream.

In some implementations of the method, non-transitory computer readable medium, or apparatus, the modification is performed by software running at a server device implementing the conference.

In some implementations of the method, non-transitory computer readable medium, or apparatus, the user request is initiated at the participant device and the modification is performed by software running at the participant device.

In some implementations of the method, non-transitory computer readable medium, or apparatus, the user request is initiated at a second participant device connected to the conference the modification is performed by software running at the second participant device.

In some implementations of the method, non-transitory computer readable medium, or apparatus, the first characteristic corresponds to a pitch of the speech, and the method comprises, the operations comprise, and the processor is configured to execute the instructions for determining that the pitch of the speech is outside of a threshold range for a threshold period of time; and prompting, based on the determination that the pitch of the speech is outside of the threshold range for the threshold period of time, the user of the participant device to initiate the user request.

In some implementations of the method, non-transitory computer readable medium, or apparatus, the first characteristic corresponds to an accent of the speech, and the method comprises, the operations comprise, and the processor is configured to execute the instructions for determining that the accent of the speech is different from an accent of speech of other users of participant devices connected to the conference; and prompting, based on the determination that the accent of the speech is different from the accent of the speech of the other users, the user of the participant device to initiate the user request.

In some implementations of the method, non-transitory computer readable medium, or apparatus, the method comprises, the operations comprise, and the processor is configured to execute the instructions for presenting, to the user of the participant device, a recommendation to apply a filter during one or more future conferences based on the modification.

In some implementations of the method, non-transitory computer readable medium, or apparatus, the output of the modified audio stream is to a first subset of participant devices connected to the conference, and the audio stream is output without the modification to a second subset of the participant devices connected to the conference.

In some implementations of the method, non-transitory computer readable medium, or apparatus, the user request is initiated while the conference remains in-progress.

In some implementations of the method, non-transitory computer readable medium, or apparatus, the user request is initiated during playback of a recording of the conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    modifying a cadence of speech of an audio stream by removing one or more periods of silence between portions of the speech to provide a modified audio stream;
    causing output of the modified audio stream in place of the audio stream in a conference; and
    presenting, to a user of a participant device providing the audio stream, a recommendation to apply a filter during one or more future conferences based on modifying the cadence.

2. The method of claim 1, comprising modifying a volume of the speech in the modified audio stream.

3. The method of claim 1, comprising:
    determining to modify the cadence based on a threshold comparison against measured values of the cadence; and
    transmitting, based on the determination to modify the cadence, a prompt configured to initiate a user request within the conference.

4. The method of claim 1, wherein the modified audio stream is produced in response to a user request initiated within the conference, and wherein the user request is obtained from the participant device.

5. The method of claim 1, wherein the modified audio stream is produced in response to a user request initiated within the conference, and wherein the user request is obtained from a participant device connected to the conference that is not providing the audio stream.

6. The method of claim 1, wherein the modified audio stream is produced and output while the conference remains in-progress.

7. The method of claim 1, wherein the modified audio stream is produced and output during playback of a recording of the conference.

8. One or more non-transitory computer readable media storing instructions operable to cause one or more processors to perform operations comprising:
- modifying a cadence of speech of an audio stream by removing one or more periods of silence between portions of the speech to provide a modified audio stream;
- causing output of the modified audio stream in place of the audio stream in a conference; and
- presenting, to a user of a participant device providing the audio stream, a recommendation to apply a filter during one or more future conferences based on modifying the cadence.

9. The one or more non-transitory computer readable media of claim 8, the operations further comprising:
- determining to modify the cadence based on a threshold comparison against measured values of the cadence; and
- transmitting, based on the determination to modify the cadence, a prompt configured to initiate a user request within the conference.

10. The one or more non-transitory computer readable media of claim 8, wherein audio streams obtained from participant devices connected to the conference are stored in separate files associated with a recording of the conference, and wherein the operations to modify the cadence of the speech to produce the modified audio stream comprise:
- altering one of the separate files corresponding to the audio stream.

11. The one or more non-transitory computer readable media of claim 8, wherein modifying the cadence is performed by software running at a server device implementing the conference.

12. The one or more non-transitory computer readable media of claim 8, wherein the modified audio stream is produced in response to a user request initiated at some participant device within the conference, and wherein modifying the cadence is performed by software running at the some participant device.

13. The one or more non-transitory computer readable media of claim 8, wherein the modified audio stream is produced in response to a user request initiated within the conference, and wherein the user request is initiated at a second participant device connected to the conference and modifying the cadence is performed by software running at the second participant device.

14. A system, comprising:
- one or more memories; and
- one or more processors configured to execute instructions stored in the one or more memories to:
  - modify a cadence of speech of an audio stream by removing one or more periods of silence between portions of the speech to provide a modified audio stream;
  - cause output of the modified audio stream in place of the audio stream in a conference; and
  - present, to a user of a participant device providing the audio stream, a recommendation to apply a filter during one or more future conferences based on modifying the cadence.

15. The system of claim 14, wherein the wherein the one or more processors are further configured to execute instructions stored in the one or more memories to:
- determine that a pitch of the speech is outside of a threshold range for a threshold period of time; and
- prompt, based on the determination that the pitch of the speech is outside of the threshold range for the threshold period of time, the user of the participant device providing the audio stream to initiate a user request to modify the pitch of the speech in the modified audio stream.

16. The system of claim 14, wherein the wherein the one or more processors are further configured to execute instructions stored in the one or more memories to:
- determine that an accent of the speech is different from an accent of speech of other users of participant devices connected to the conference; and
- prompt, based on the determination that the accent of the speech is different from the accent of the speech of the other users, the user of the participant device providing the audio stream to initiate a user request to modify the accent of the speech in the modified audio stream.

17. The system of claim 14, wherein the modified audio stream is caused to be output to a first subset of participant devices connected to the conference, and wherein the audio stream is output without the modification to a second subset of the participant devices connected to the conference.

18. The system of claim 14, wherein a user request to modify the cadence of the speech is initiated while the conference remains in-progress.

19. The system of claim 14, wherein a user request to modify the cadence of the speech is initiated during playback of a recording of the conference.

20. The one or more non-transitory computer readable media of claim 8, the operations further comprising:
- receiving, during playback of a recording of the conference, a user request to modify the cadence of the speech is initiated.

* * * * *